United States Patent [19]

Papandrea

[11] Patent Number: 5,419,249
[45] Date of Patent: May 30, 1995

[54] BARBECUE GRILL UNIT

[75] Inventor: Frank Papandrea, Norwich, N.Y.

[73] Assignee: Giuseppe A. Papandrea, Oneonta, N.Y.

[21] Appl. No.: 96,442

[22] Filed: Jul. 26, 1993

[51] Int. Cl.⁶ ............................................. A47J 37/04
[52] U.S. Cl. ............................. 99/421 HH; 99/421 P; 99/421 R; 99/427; 99/448
[58] Field of Search ................ 99/419, 421 R, 421 H, 99/421 HH, 421 HV, 421 P, 427, 448

[56] References Cited

U.S. PATENT DOCUMENTS

| | | | |
|---|---|---|---|
| 1,491,945 | 4/1924 | Clement | 99/427 |
| 2,253,434 | 8/1941 | Kernick | 99/421 H |
| 2,618,730 | 11/1952 | Panken | 99/421 H |
| 2,762,293 | 9/1956 | Boyajian | 99/421 H |
| 2,888,872 | 6/1959 | Bathe | 99/427 |
| 3,103,161 | 9/1963 | Whitehead | 99/427 |
| 3,339,479 | 9/1967 | Miller | 99/421 HV |
| 3,442,201 | 5/1969 | Kates | 99/421 R |
| 4,112,832 | 9/1978 | Severdia | 99/421 HV |
| 4,944,282 | 7/1990 | Aguiar | 99/421 H |

FOREIGN PATENT DOCUMENTS 487467 11/1929 Germany .......................... 99/421 P Primary Examiner—David A. Scherbel
Assistant Examiner—Terrence R. Till
Attorney, Agent, or Firm—George R. McGuire

[57] ABSTRACT

A barbecue grill unit having a plurality of elongated food support units extending transversely across the open top portion of the grill body. The food support units are each simultaneously rotatable about their respective longitudinal axes. The grill unit further includes a selectively positionable rotisserie assembly, and a plurality of longitudinally elongated heat controlling louvers extending in side by side relation longitudinally across the grill body. The louvers are positioned between the rotatable food support units and the heat generation means and are manually, simultaneously rotatable about their respective longitudinal axes thereby permitting selective control of the amount of convective heat passing from the heat generation means to the food support units. An alternate embodiment of the present invention provides a modular barbecue grill assembly wherein a plurality of non-power equipped grill units can be operably coupled to one, power equipped grill unit.

10 Claims, 6 Drawing Sheets

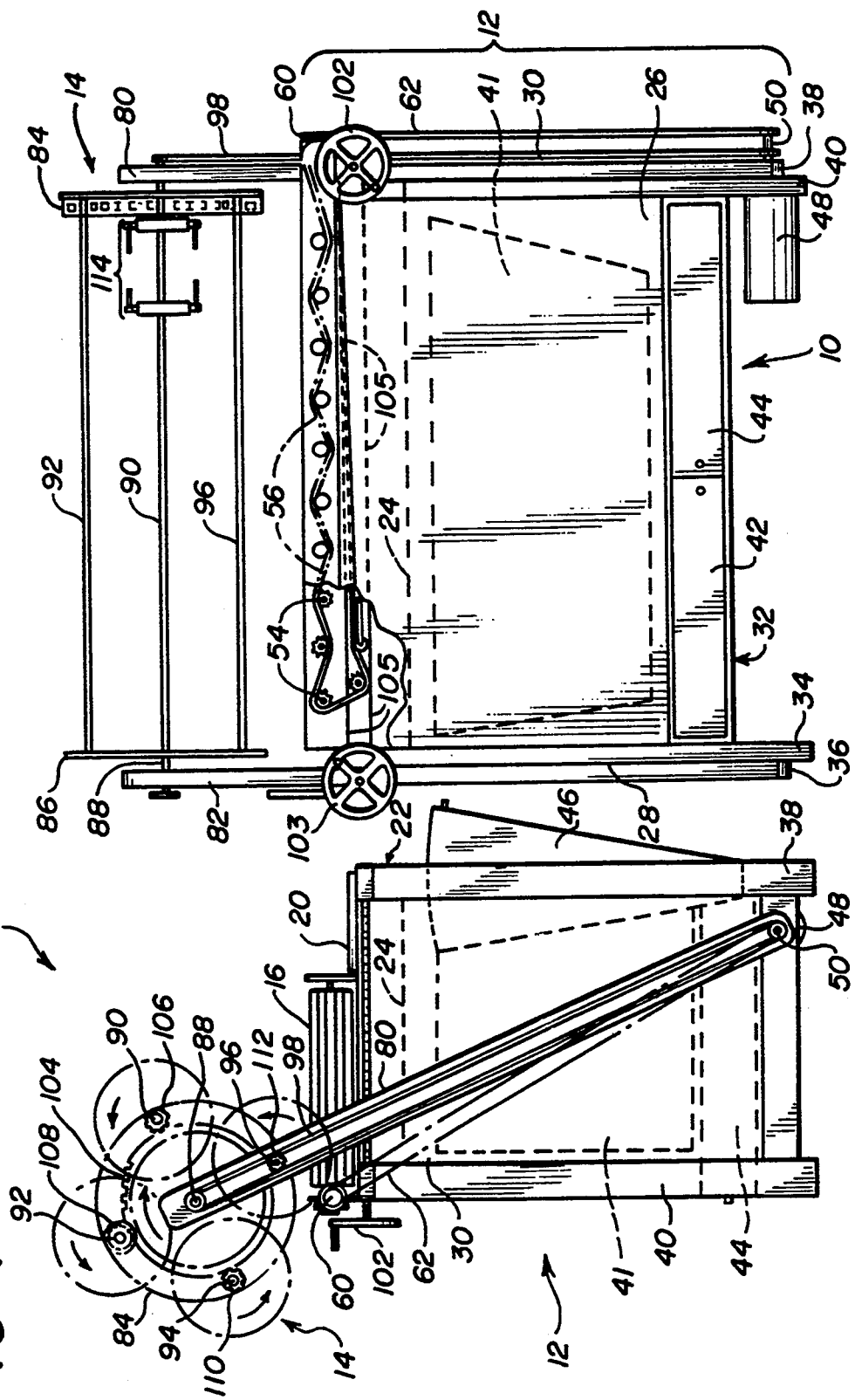

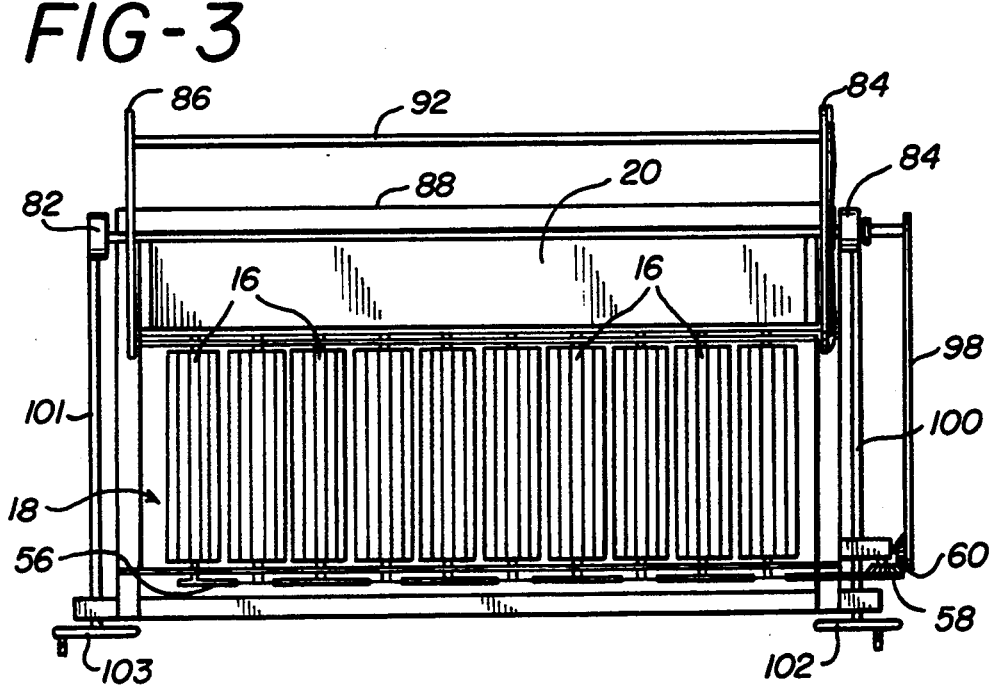
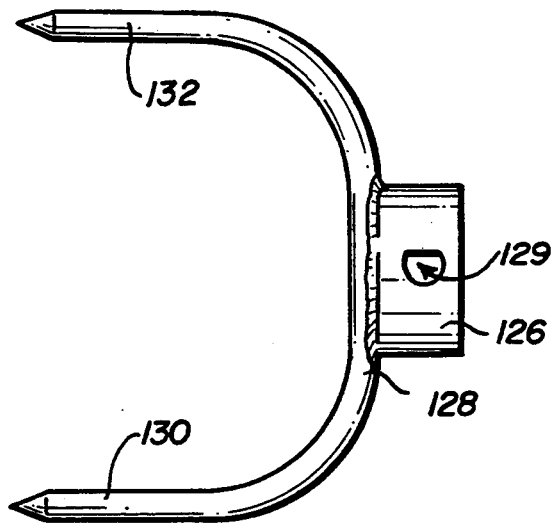
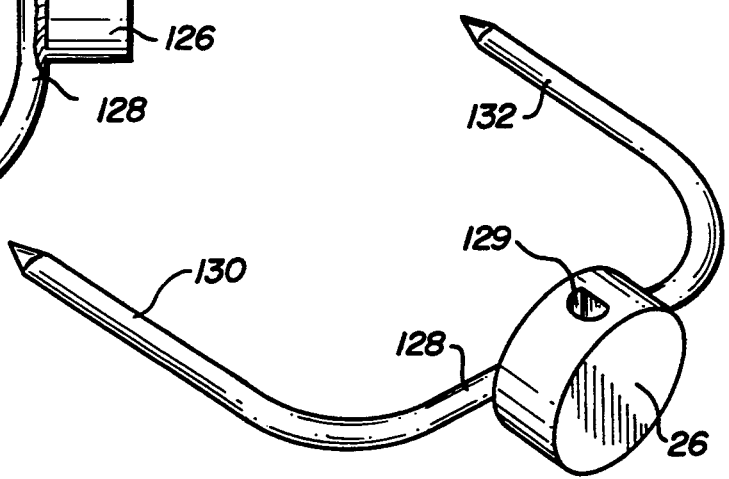

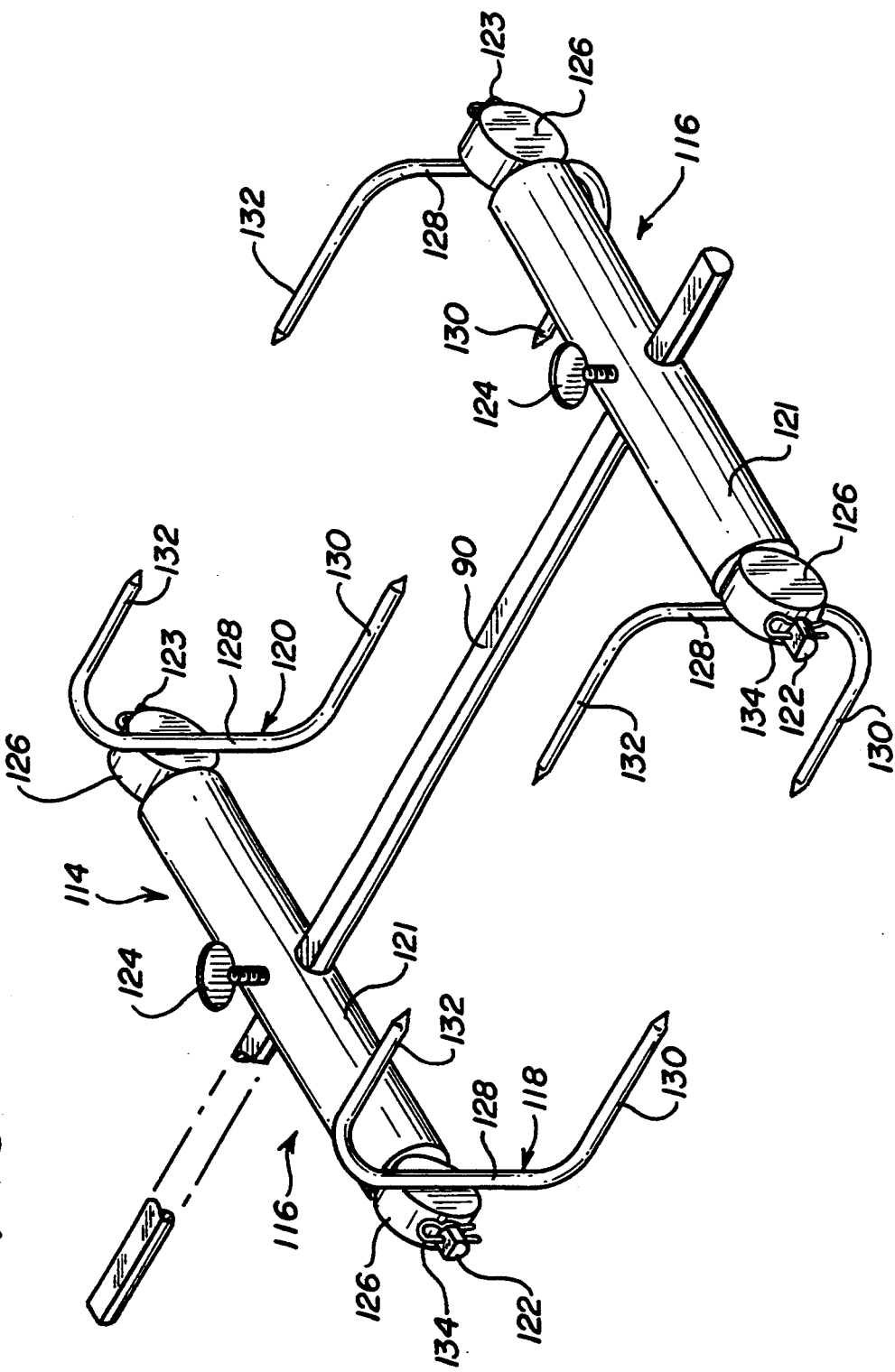

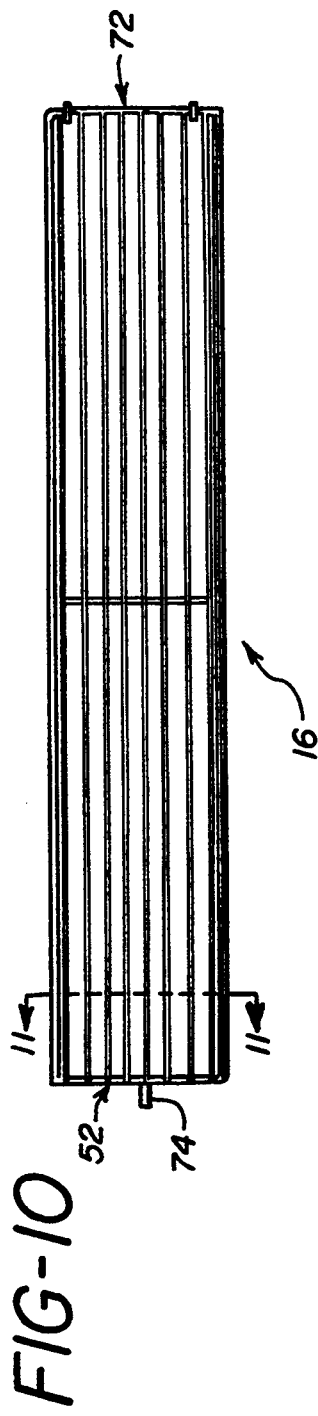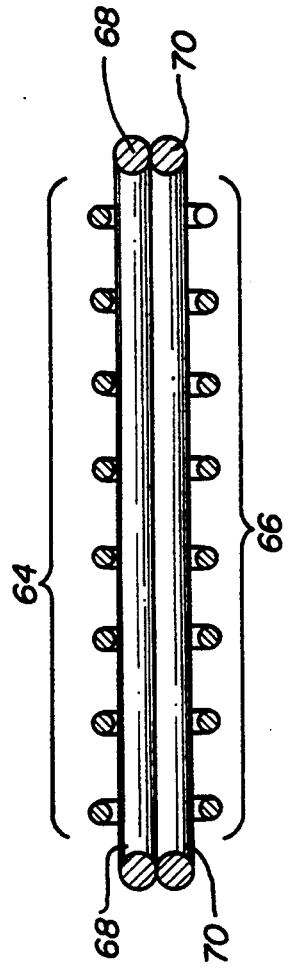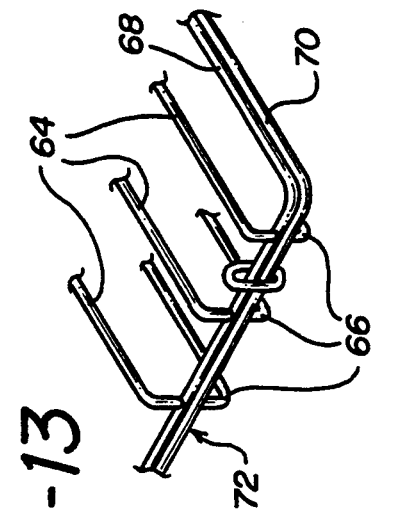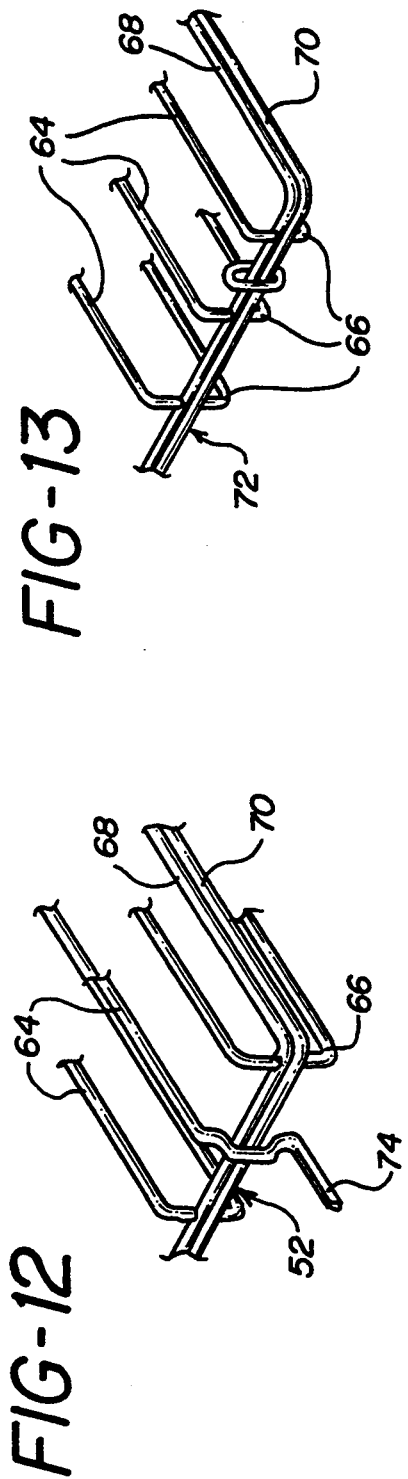

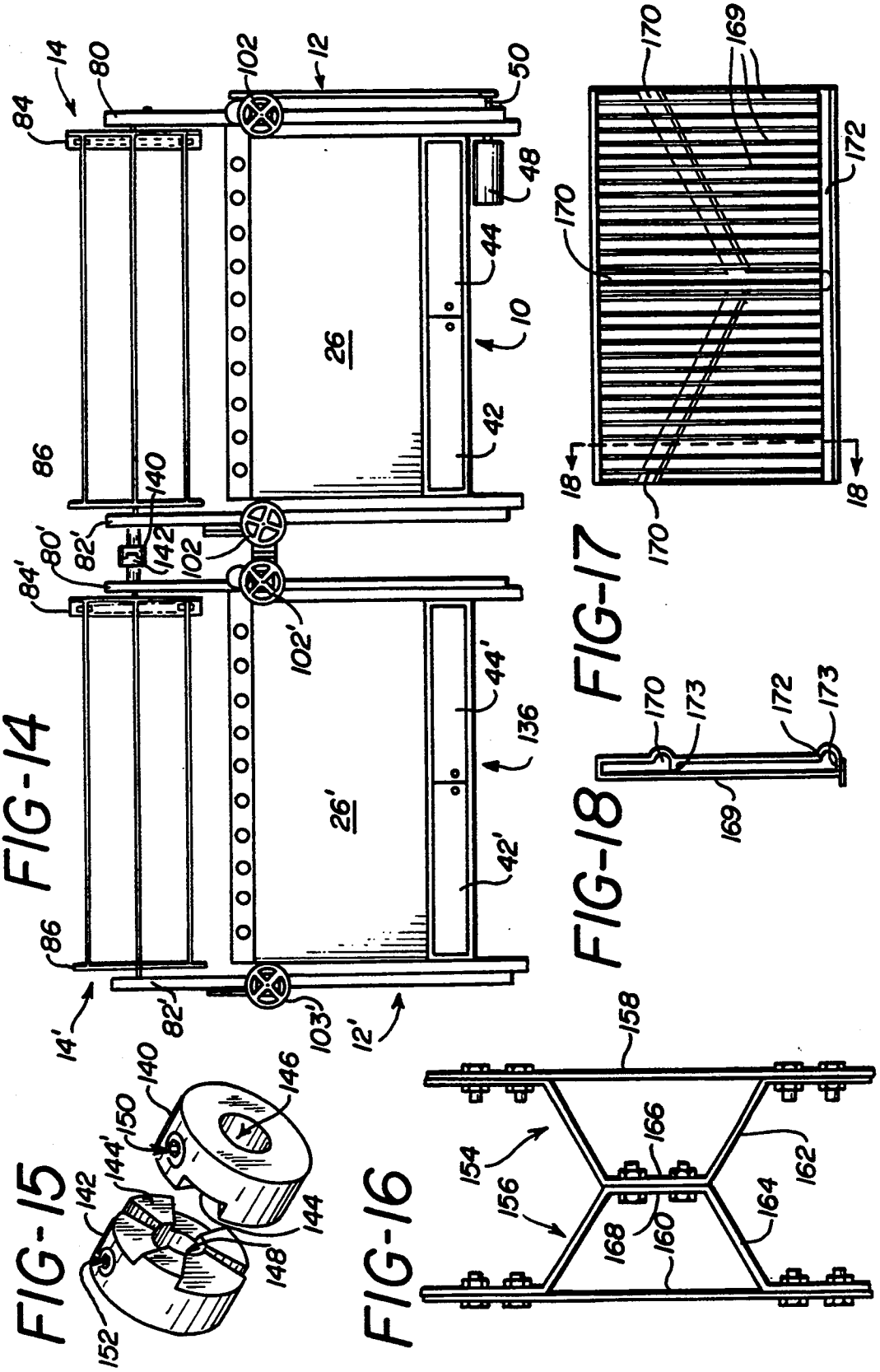

5,419,249

BARBECUE GRILL UNIT

BACKGROUND OF THE INVENTION

The present invention broadly relates to cooking apparatus and, more specifically, to barbecue grill units. The present invention further relates to large scale grill units typically used in the restaurant industry.

Typically, barbecue grills used in restaurants, or other large scale cooking operations, include a large grid-like grilling area positioned in vertically spaced relation above an appropriate cooking medium (i.e., coals, lava rocks, etc.) for placement of food thereon. It is also common for these grills to include a rotisserie rotatably mounted in vertically spaced relation above the grid-like grill area, thereby permitting large roasts, chickens, or the like, to be rotated above the cooking medium and thereby cooked by the barbecuing process.

While the traditional restaurant oriented barbecue grill permits the cooking of a large quantity of food at a single time, they also include many disadvantageous qualities non-conducive to properly preparing large quantities of food. Included among these disadvantages is the fact that food cooking on the grill area, as well as the rotisserie, must be constantly monitored to prevent overcooking. If the food is not repositioned appropriately (i.e., flipped, rotated, etc.), a portion of the food may become charred and burnt, while other portions may be undercooked, thereby rendering the particular article of food somewhat unpalatable.

An additional disadvantage among traditional grills is that once the food has finished cooking, it must be immediately removed from the grill to prevent overcooking. Therefore, if the particular article of food is not going to be eaten soon after being removed from the grill, it will become cold and need to be reheated, thus diminishing its taste.

An additional disadvantage of these traditional grills is the uncontrolled heat emitted by the cooking medium. Any cooking medium, other than propane released through a tank having a regulator valve, continually fluctuates in temperature, either becoming hotter or cooler depending on how it is treated. As a consequence, it is difficult for the cook to accurately sustain and monitor the distribution of the cooked food.

OBJECTS AND ADVANTAGES

It is therefore a principal object of the present invention to provide a restaurant oriented barbecue grill unit having means for evenly cooking the food positioned thereon.

It is a further object of the present invention to provide a barbecue grill unit having means for more accurately controlling the convection heat.

It is another object of the present invention to provide a plurality of barbecue grills having novel and improved means to transfer power for rotating rotisseries to successive, operably coupled grills.

Other objects and advantages of the present invention will in part be obvious and in part appear hereinafter.

SUMMARY OF THE INVENTION

In accordance with the foregoing objects and advantages, the present invention provides a restaurant oriented barbecue grill unit generally comprised of a rectilinear base unit having a longitudinally elongated, open top portion and a selectively adjustable rotisserie unit pivotally attached to the base unit. The barbecue grill of the present invention further includes a plurality of elongated food support units rotatably positioned in side by side relation to one another, with each unit extending across the open top portion of the base unit transverse to the longitudinal axis thereof. In addition, a series of elongated, selectively adjustable, heat controlling louvers are positioned in side by side relation, longitudinally across the base unit in spaced, vertical relation below the food support units.

The food support units of the present invention are generally comprised of a pair of substantially identical, concave, elongated grid members having respective sets of rods extending longitudinally between a respective rectangularly shaped frame. The pair of grid members are hingedly connected to one another at a narrow end thereof and are selectively movable between an open position and a locked, closed position. When in the closed position, the two rectangularly shaped frame members abut one another and define a cavity between the elongated rods. Food, such as hamburger patties, may be lockingly positioned in the cavity formed in the food support units to provide secure exposure of the food to the cooking medium.

The food support units are positioned transversely across the open top portion of the barbecue grill and are fixedly attached at one end to a sprocket which is rotatably connected to the base unit of the grill. A first, endless chain linked belt engages the successive sprockets and a first bevel gear at one end. A second belt tautly extends about a second bevel gear and a drive shaft extending outwardly from a conventional motor. Therefore, when the motor is actuated, each food support unit connected to the sprockets is rotated about its respective longitudinal axis via the rotary motion transferred thereto by the belt and gear arrangement. This cooking arrangement ensures that the food (i.e., hamburger patties) placed in the food support units will be cooked evenly.

To provide a predetermined amount of heat to the food support units, a selectively adjustable set of louvers are positioned between the food support units and the cooking medium. The louvers are simultaneously movable between a first completely open position wherein a maximum amount of heat is transferred to the food support units and wherein each louver extends in a substantially vertical plane, and a second, completely closed position wherein little to no convection heat escapes from beneath the louvers and each louver extends in a substantially horizontal plane. A lever positioned on the outwardly facing surface of a side wall of the base unit controls and produces the simultaneous movement of the set of louvers upon manual manipulation thereof.

The rotisserie assembly of the present invention includes a hollow, cylindrical housing and a circular plate held in parallel, spaced relation to one another by a spindle extending centrally therethrough, and a plurality of skewer support rods annularly positioned therebetween, about the housing and plates' respective peripheries, and wherein the housing includes a gear centrally positioned therein. The spindle rod frictionally extends through the housing and the plate, and the gear positioned therein, and terminates a small distance form the outwardly facing surfaces thereof, while the skewer support rods include a gear on their respective ends which terminate within the housing wherein each of the gears cooperatively engage the centrally positioned gear. A third, endless belt tautly extends about one end of the spindle rod and the drive shaft extending outwardly from the motor, thereby providing rotary motion to the rotisserie assembly upon actuation of the motor. In addition, as the gear centrally positioned within the housing rotates, each of the skewer support rods counter-rotate due to the engagement of their gears with the central gear.

The positioning of the rotisserie assembly is selectively adjustable with respect to the cooking medium. A pair of elongated arms pivotally connects the rotisserie assembly to the base unit, and a pair of hand wheels attached to the base unit, which include respective threaded shafts operably extending between the wheel and the pivot arm, may be manually manipulated to adjust the position of the rotisserie assembly. The rotisserie may be positioned anywhere between being completely out of vertical alignment with the base unit (i.e., no direct influence from the cooking medium) and being in direct, vertical alignment with the base unit (i.e., directly influenced by the cooking medium). Therefore, any food (i.e., chicken) positioned on the rotisserie may be cooked as slowly, or as fast, as desired.

These and other elements and features of the present invention will be described in greater detail hereinafter.

BRIEF DESCRIPTION OF THE DRAWINGS

FIG. 1 is a side elevational view of a barbecue grill unit showing, in particular, the rotatability of a rotisserie assembly attached to the grill unit;

FIG. 2 is a front elevational view of the grill unit of FIG. 1;

FIG. 3 is a top plan view of the grill unit of FIG. 1;

FIG. 7 is a top plan view of a single skewer element;

FIG. 8 is a perspective view of the skewer of FIG. 7;

FIG. 9 is a perspective view of a skewer assembly;

FIG. 10 is a top plan view of a food support unit;

FIG. 11 is a cross-sectional view of a food support unit taken along line 11—11 of FIG. 10;

FIG. 12 is a fragmentary perspective view of a first end of the food support unit of FIG. 10;

FIG. 13 is a fragmentary perspective view of a second end of the food support unit of FIG. 10;

FIG. 14 is a front elevational view of a second embodiment of the present invention wherein a first, motor equipped grill unit is operably connected to a nonmotor equipped, second grill unit;

FIG. 15 is a perspective view of the rotary locking members utilized to couple the two grills of FIG. 14 together;

FIG. 16 is a top plan view of a pair of connecting brackets used to fixedly attach the two grills of FIG. 14 together;

FIG. 17 is a top plan view of grid type grill area used in the second grill unit of FIG. 14; and FIG. 18 is a cross-sectional view of the grid type grill area taken along line 18—18 of FIG. 17.

DETAILED DESCRIPTION

Figure 4:
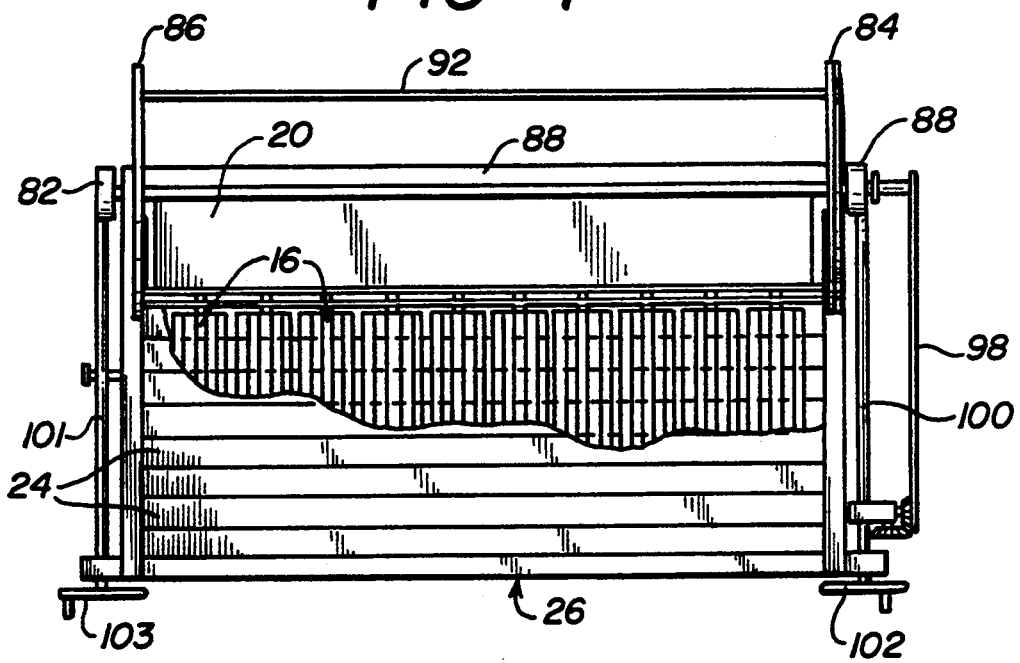
FIG. 4 is the top plan view with portions partially cut away to show a plurality of heat control louvers in a first, closed position.

Referring now to the drawing, there is seen in FIGS. 1-5 a restaurant oriented, barbecue grill unit, denoted generally by reference numeral 10, which is basically comprised of a rectilinear base unit 12, longitudinally elongated from side to side, and a rotisserie assembly 14 pivotally attached to base unit 12. Barbecue grill 10 is seen to further include a plurality of elongated food support units 16 extending in laterally spaced, side by side relation to one another with each support unit 16 being positioned in vertically spaced relation above the open top portion 18 of base unit 12, transverse to the longitudinal axis thereof. Grill 10 further includes a conventional, grid-like grill area 20 extending longitudinally across open top portion 18, adjacent the rear wall 22 of base unit 12, and a plurality of selectively adjustable, heat control louvers 24 (see FIGS. 4 and 5) extending in side by side relation to one another, longitudinally across open top portion 18. Louvers 24 generally extend in a horizontal plane positioned between food support units 16 and the cooking medium 25 (charcoal is the preferred, but not the only, cooking medium).

More specifically, base unit 12 is comprised of a rectilinear frame having open top portion 18 and solid, planar, front, rear, side, and bottom walls 26, 22, 28, 30 and 32, respectively. Bottom wall 32 is held in spaced relation above ground, or floor, level by four legs 34, 36, 38 and 40 extending downwardly from each of the four corners of base unit 12.

Barbecue grill 10 further includes means for facilitating the cleaning of base unit 12. As previously mentioned, heat sustaining charcoal held by a firebox 41 housed within base unit 12 is the preferred cooking medium. As the coals are burned, an ash is produced which tends to accumulate rather quickly and decrease the effectiveness of the burning coals if not removed periodically. A pair of ash drawers 42 and 44 are slidably positioned in front wall 26 of base unit 12 to catch the ash as it falls, facilitating the cleaning of grill 10.

Firebox 41 is a trapezoidally shaped charcoal holding mechanism which includes a pivotal, heat directing rear wall 46. Heat directing wall 46 is pivotally connected, longitudinally across, rear wall 22 of base unit 10 and is operable between a first, open, accessible position (shown by solid lines in FIG. 1), and a second, closed position (shown by dotted lines in FIG. 1). When in the closed position, heat directing wall 46 lies flush with rear wall 22 of base unit 10. When in the open position, heat directing wall 46 permits accessibility to the interior of firebox 41 thereby permitting more coal to be added to the fire. The open position also acts as a means to direct heat to a position not in vertical alignment with open portion 18. This is useful when rotisserie assembly 14 is selectively positioned in laterally offset relation to rear wall 22, and it is desirable to provide heat to the food held on the rotisserie.

In addition, base unit 12 includes a conventional electric motor 48 fixedly mounted to the inwardly facing surface of side wall 30, beneath bottom wall 32. Motor 48 includes a conventional drive shaft 50. The purpose of motor 48 is to transmit power to food support units 16 and rotisserie assembly 14 as will be more fully explained hereinafter.

As previously mentioned, food support members 16 extend in laterally spaced, side by side relation to one another with each unit lying in vertically spaced relation above open top portion 18 of base unit 12, transverse to the longitudinal axis thereof. As seen most clearly in FIGS. 2 and 3, food support units 16 each include a first end 52 securely connected to a corresponding sprocket 54 which is rotatably mounted to the inwardly facing surface of front wall 26. Sprockets 54 are rotated by a first, endless chain belt 56 which passes over and under successive sprockets 54 and about a first, 45 degree bevel gear 58 positioned adjacent the outwardly facing surfaces of wall 30 of base unit 12. A second, 45 degree bevel gear 60 operatively engages bevel gear 58. Second, endless belt 62 tautly passes about gear 60 and drive shaft 50. Therefore, upon actuation of motor 48, sprockets 52 rotate due to the power transferred thereto via the cooperative arrangement of belts 56 and 62, bevel gears 58 and 60, and drive shaft 50. Thus, food support units 16 are continually rotated at a constant rate about their respective longitudinal axes, thereby ensuring that food supported therein will be evenly cooked.

The structure of food support units 16 is shown in detail in FIGS. 10-13. Each food support unit 16 is comprised of first and second sets of elongated rods 64 and 66 extending from respective first and second rectangularly configured frame rods 68 and 70 hingedly attached to one another at the shorter end 72, opposite end 52 to which a sprocket is connected (see FIG. 3). Each of rods 64 and 66 extends a small distance perpendicularly away from frames 68 and 70 before extending longitudinally across the frames, thereby creating a cavity when frames 68 and 70 are superposed, (i.e., in a closed position). A handle 74 is positioned adjacent end 52 to provide means for opening and closing first and second sets of rods 64 and 66 relative to one another.

Figure 5:
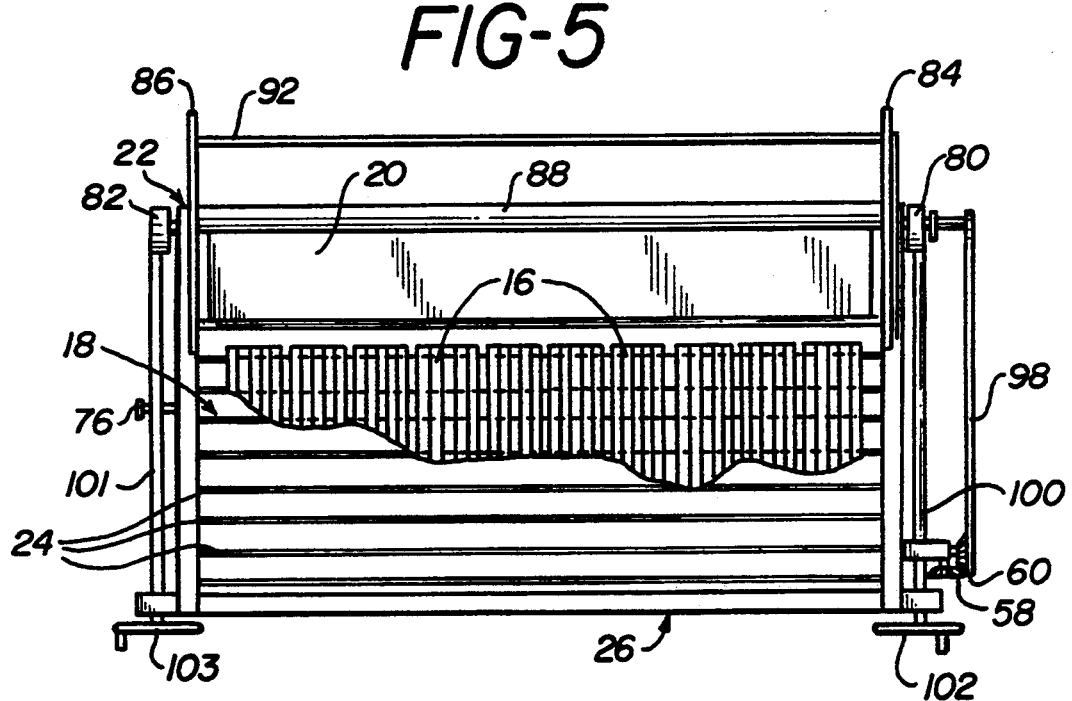
FIG. 5 is a top plan view showing the heat control louvers in a second, open position.
Figure 6:
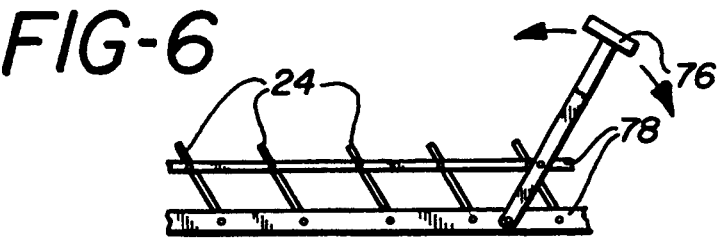
FIG. 6 is a partial side elevational view of a louver control lever mechanism.

Referring once again to FIGS. 4 and 5, heat control louvers 24 are seen to be rotatably mounted longitudinally across base unit 12 in a substantially horizontal plane positioned between food support units 16 and firebox 41. Louvers 24 are selectively adjustable between fully open (FIG. 5) and fully closed (FIG. 4) positions by means of a lever handle 76 connected to a lever arm 78 which mechanically links each louver 24 together and simultaneously adjusts the positions thereof. By appropriate manual force to handle 76, the linking arrangement of lever arm 78 to louvers 24 produces the selective positioning of louvers 24 as is clearly shown in FIG. 6. As would seem obvious, when louvers 24 are positioned in their fully open position, as shown in FIG. 5, the maximum amount of heat is exposed to food support units 16 and rotisserie assembly 14. When louvers 24 are in their fully closed position, as seen in FIG. 4, no direct heat impinges food support units 16 or rotisserie 14. Therefore, cooking time and temperature can be selectively controlled through the manual manipulation of louvers 24.

Referring back to FIGS. 1 and 2, rotisserie assembly 14 is seen to be pivotally attached to base unit 12 by elongated arms 80 and 82 whereby rotisserie assembly 14 is selectively positionable forwardly and rearwardly with respect to base unit 12. Rotisserie assembly 14 extends in vertically spaced relation longitudinally across open barbecue grill 10 and is generally comprised of a hollow, cylindrical housing 84 and a circular plate 86 coaxially mounted in parallel, spaced relation to one another upon a spindle 88 frictionally extending centrally through housing 84 and plate 86 and through one end of pivot arms 80 and 82. In addition, four skewer support rods 90, 92, 94 and 96 extend in annularly spaced relation between housing 84 and plate 86. Third, endless belt 98 tautly extends about drive shaft 50 and spindle 88 to provide rotary motion to rotisserie assembly 14 upon actuation of motor 50. Furthermore, elongated, threaded shafts 100 and 101, respectively, extend between threaded, slotted apertures (not shown in the drawings) formed through pivot arms 80 and 82 and hand wheels 102 and 103 thereby providing the selective, pivotal motion to rotisserie assembly 14 upon manual rotation of either hand wheel 102 or 103. Hand wheels 102 and 103 are positioned adjacent front wall 26 and respective side walls 28 and 30 of base unit 12. A fourth endless belt 105 longitudinally extends through front wall 26 and about handwheels 102 and 103. Therefore, upon manual rotation of either handwheel 102 or 103, the other hand wheel will simultaneously rotate, thereby evenly moving rotisserie assembly to its desired position.

Gear 104 is mounted within housing 84 upon spindle 88 which frictionally passes centrally through gear 104. Gears 106, 108, 110 and 112 are fixedly attached to the ends of skewer support rod 90, 92, 94 and 96, respectively, which terminate within housing 84. Gears 106, 108, 110 and 112 are cooperatively positioned about, and in mating engagement with, the periphery of gear 104. Therefore, upon actuation of motor 50, gear 104 rotates about its central axis due to its frictional attachment to spindle 88, causing gears 106, 108, 110 and 112 to counter-rotate with respect to gear 104. The food positioned on support rods 90, 92, 94 and 96 will therefore rotate above grill 10 at a constant rate, thereby providing even distribution of heat to the food.

Skewer support rods 90, 92, 94 and 96 are, of course, used to securely hold a plurality of skewering units, denoted generally by reference numeral 114 and seen clearly in FIG. 9, above base unit 12. Skewering units 114 are basically comprised of an elongated skewer holding member 116 which may be slidingly positioned on any one of skewer support rods 90, 92, 94 and 96, and a pair of U-shaped skewers 118 and 120 slidingly positioned in laterally spaced relation to one another on the opposite ends of holding member 116.

More specifically, elongated holding member 116 includes a cylindrical body 121 having a semi-circular aperture transversely formed therethrough which corresponds to the semi-circular cross-section of skewer support rods 90, 92, 94 and 96, and a pair of stub shafts 122 and 123 extending outwardly from cylindrical body 121. A wing nut 124 extends into a threaded opening in body 121 and intersects the semi-circular aperture. Once holding member 114 is slidingly positioned to a predetermined position on support rod 90, 92, 94 or 96, wing nut 124 may be threaded downwardly until it securely abuts rod 90, 92, 94 or 96 thereby preventing movement of holding member 114 along rod 90, 92, 94 or 96. The semi-circular geometry of the aperture and support rods prohibits any rotation of holding member 114 once positioned on support rods 90, 92, 94 and 96.

U-shaped skewers 118 and 120 may be slidingly, yet securely, positioned on semi-circular shafts 122 and 123. As seen most clearly in FIGS. 7 and 8, skewers 118 and 120 include a connecting element 126 fixedly connected at the approximate midpoint of the base portion 128 of the skewer, which includes two projecting skewering elements 130 and 132 extending outwardly in parallel, laterally spaced relation to one another from base portion 128. Connecting element 126 includes a semi-circular aperture formed therethrough which corresponds to the semi-circular cross-section of shafts 122 and 123 permitting non-rotatable, slidable positioning of skewers 118 and 120 on holding member 114. The semi-circular apertures are formed through connecting element 126 such that when positioned on shafts 122 and 123, base portion 128 extends in perpendicular relation with respect to holding member 114. Skewers 118 and 120 are retained on shafts 122 and 123 by cotter pins 134.

Referring now to the alternate embodiment of the present invention, there is seen in FIG. 14 two grill units operably positioned in side by side relation to one another. The first grill unit is substantially identical to grill unit 10 and will therefore retain the same reference numerals for like parts as previously described in the specification, while the other grill will be denoted generally by reference numeral 136. Grill unit 136 is substantially identical to grill unit 10 except for the exclusion of motor 48 and the substitution of a single, stationary food support unit 138 for the plurality of rotatable food support units 16. The parts of grill unit 136 which correspond to parts of grill unit 10 will be denoted by like reference numerals with a prime sign.

Rotisserie assemblies 14 and 14' are operably connected to one another by rotary coupling members 140 and 142 slidably attached to spindles 82 and 82', respectively. Rotary coupling members 140 and 142 can be seen in FIG. 15 as including corresponding dovetail type joints 144, and 144' formed on planar, facing surfaces to cooperatively engage one another and securely, rotatably connect rotisseries 14 and 14'. Coupling members 140 and 142 include respective, centrally formed through openings 146 and 148 to permit their slidable positioning on adjacent ends of spindles 82 and 82', and threaded openings 150 and 152 to receive respective set screws. Rotary coupling members 140 and 142 transmits the rotary motion supplied to rotisserie 14 by motor 48 directly to rotisserie 14'.

Although rotary coupling members 140 and 142 provide a connection between grill units 10 and 136, a more secure connection between the two is provided by brackets 154 and 156. Brackets 154 and 156, as clearly seen in FIG. 16, include a respective, flat, back portions 158 and 160 which firmly abut, and bolt to, side walls 28 and 30', respectively. Protruding portion 162 and 164 include flat, opposing portions 166 and 168 which firmly abut, and bolt to each other, thereby providing a secure attachment. This secure attachment between grill units 10 and 136 provides rotary coupling members 140 and 142 with a minimum amount of stress acting thereon, thereby maximizing the effectiveness with which they operate.

Grill 136 is equipped with stationary, rectangular, food support unit 138, comprising a plurality of spaced, parallel rods 169, instead of rotatable food support units 16. When food support unit 138 is positioned in grill 136, rods 169 lie in a sloping plane extending downwardly from the rear of grill 136 to the front of grill 136. Food support unit 138 is seen in FIGS. 17 and 18 to further include drip channels 170 which converge into a single channel 172 which extends longitudinally across the front end of grill 136. Grease and sauce falling from food placed on food support unit 138 tend to stick to rods 169 and run along the rods towards the front end of grill 136. Elongated protrusions 173 formed on food support unit 138 adjacent drip channels 170 and 172 cause the liquids to drop off of rods 169 and into drip channels 170 and 172. Channel 172 leads all grease dripping from grill area 138 away from the cooking medium, thereby increasing the cleanliness and effectiveness of grill 136.

What is claimed is:

1. A barbecue grill comprising:

a) a longitudinally elongated grill body unit defining an open interior space for acceptance of heat generating means, said grill body unit having inwardly and outwardly facing surfaces, said open space extending upwardly to an open end whereby said open end permits passage of the heat created by said heat generating means;
b) at least one elongated food support unit extending along a longitudinal axis transversely across said open end of said grill body;
c) means for rotatably mounting said food support unit to said grill body;
d) means for rotating said at least one elongated food support unit about said food support unit's longitudinal axis; and
e) a rotisserie assembly extending longitudinally across said grill body unit, said rotisserie being pivotally connected to, and selectively positionable with respect to, said grill body unit.

2. The invention according to claim 1 wherein said rotatably mounting means includes said at least one food support unit fixedly attached to a corresponding sprocket rotatably attached to an inwardly facing surface of said grill body adjacent said open end.

3. The invention according to claim 2 wherein said means for rotating said at least one food support unit includes a motor having a longitudinally elongated drive shaft extending outwardly therefrom, said drive shaft rotatable about a longitudinal axis upon actuation of said motor, first and second perpendicularly engaged bevel gears positioned adjacent said open end and an outwardly facing surface of said body unit, a first belt tautly extending about said drive shaft and said first bevel gear, and a second belt tautly extending about said at least one sprocket and said second bevel gear, whereby upon actuation of said motor, said drive shaft rotates and transfers power to said at least one food support member via said first and second bevel gears and said first and second belts.

4. The invention according to claim 1 wherein said barbecue grill further includes a plurality of longitudinally elongated food support units rotatably mounted in side by side relation to said grill body unit transversely across said open end of said grill body unit.

5. The invention according to claim 4 wherein said barbecue grill includes means for simultaneously rotating each of said plurality of elongated food support units about their respective longitudinal axes.

6. The invention according to claim 1 wherein said rotisserie assembly includes a hollow, cylindrical housing and a circular plate held in spaced, parallel relation to one another by a spindle frictionally extending centrally therethrough and a plurality of skewer support rods annularly positioned about said cylindrical housing and said circular plate and extending therebetween.

7. The invention according to claim 6 wherein said skewer support rods include at least one skewer assembly removably attached thereto.

8. The invention according to claim 6 wherein said barbecue grill includes means for rotating said spindle in a first direction whereby said cylindrical housing and said circular plate rotate about their respective central, radial axes.

9. The invention according to claim 8 wherein said rotisserie assembly includes means for rotating said plurality of skewer support rods about their respective longitudinal axes in a second direction opposite said first direction.

10. The invention according to claim 9 wherein said rod rotating means comprises:
   a) said hollow, cylindrical housing includes a first gear housed therein, wherein said spindle frictionally extends centrally through said gear thereby rotating said gear in said first direction upon rotation of said spindle;
   b) said skewer support rods each including a respective second gear positioned on their respective ends which terminate within said cylindrical housing, wherein said second gears cooperatively, matingly engage said first gear, thereby rotating in a second direction, opposite said first direction, upon rotation of said spindle.

* * * * *